DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 7, 1970

873 O.G. 17

T873,004

ADDITION OF IODIDE BEFORE OR DURING FOGGING OF DIRECT-POSITIVE EMULSIONS

Evan Thomas Jones, Rochester, Kirby Mitchell Milton, Fishers, and Glen Marshall Dappen, Webster, N.Y. (all of Kodak Park Division, Rochester, N.Y. 14650)

Filed Sept. 16, 1969, Ser. No. 858,542
**Int. Cl. G03c *1/08***
U.S. Cl. 96—107
No Drawing. 14 Pages Specification

This invention relates to an improved process for preparing direct-positive silver halide emulsions wherein a water-soluble iodide, such as potassium iodide, is added to the silver halide emulsion before or during uniform fogging of the silver halide emulsion. Preferably, the emulsion is heated after the addition of said iodide. Generally, blue-sensitive, direct-positive silver halide emulsions made by this procedure exhibit improved photographic properties such as increased speed, $D_{max}$ increase, increased rate of fogging and improved $D_{min}$. When the silver halide emulsion comprises grains which are substantially free of sites for the deposition of photolytic silver, $D_{min}$ is highly improved. However, covered-grain, direct-positive emulsions containing sites for the deposition of photolytic silver exhibit improved image properties when prepared by the process. The fogging of the emulsion can be carried out by known techniques and preferably by reduction fogging or reduction and gold fogging. Electron acceptors and/or halogen conductors are preferably used in the fogged, direct-positive emulsions. Emulsions prepared in accordance with this process wherein the halide is predominantly chloride can be processed with developers to provide low $D_{min}$ in the image record.